United States Patent
Monell et al.

(10) Patent No.: US 6,654,608 B1
(45) Date of Patent: Nov. 25, 2003

(54) TAILORED POWER LEVELS AT HANDOFF AND CALL SETUP

(75) Inventors: Gunnar Monell, Solna (SE); Thomas Östman, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/471,128

(22) Filed: Dec. 23, 1999

Related U.S. Application Data

(60) Provisional application No. 60/131,223, filed on Apr. 27, 1999.

(51) Int. Cl.[7] .................................................. H04Q 7/20
(52) U.S. Cl. .................. 455/436; 455/438; 455/440; 455/442; 455/69; 455/522; 370/332
(58) Field of Search ......................... 455/522, 69, 436, 455/442, 443, 422, 435, 561, 562, 437–441; 370/331–334

(56) References Cited

U.S. PATENT DOCUMENTS

| | | | |
|---|---|---|---|
| 5,566,209 A | 10/1996 | Forssén et al. | |
| 5,603,089 A | 2/1997 | Searle et al. | |
| 5,841,768 A | 11/1998 | Ozluturk et al. | |
| 5,848,358 A | 12/1998 | Forssén et al. | |
| 5,862,489 A | 1/1999 | Aalto | |
| 5,924,020 A | 7/1999 | Forssén et al. | |
| 6,049,535 A | * 4/2000 | Ozluturk et al. | 370/335 |
| 6,160,999 A | * 12/2000 | Chheda et al. | 455/69 |
| 6,418,327 B1 | * 7/2002 | Carey et al. | 455/562 |

FOREIGN PATENT DOCUMENTS

| | | |
|---|---|---|
| EP | 0 957 593 | 11/1999 |
| GB | 2 174 573 | 11/1986 |
| WO | 97/07600 | 2/1997 |

\* cited by examiner

*Primary Examiner*—Tracy Legree

(57) ABSTRACT

Methods and apparatus for controlling the initial transmit power from a base station to a mobile station at call set-up and call handoff. The initial transmit power from a base station during a call set-up can be reduced from the conventional full power level by a sum of the hysteresis value for the cell which is handing off the mobile station and the hysteresis value for the cell which is receiving the mobile station. When a mobile station initiates or receives a call, the initial transmit power from a base station to the mobile station is reduced from the full power level by the hysteresis value for the hysteresis zone which surrounds the cell in which call set-up is to occur. The reduction in the initial power levels reduces interference caused to surrounding cells at the initiation of a call set-up or call handoff.

16 Claims, 9 Drawing Sheets

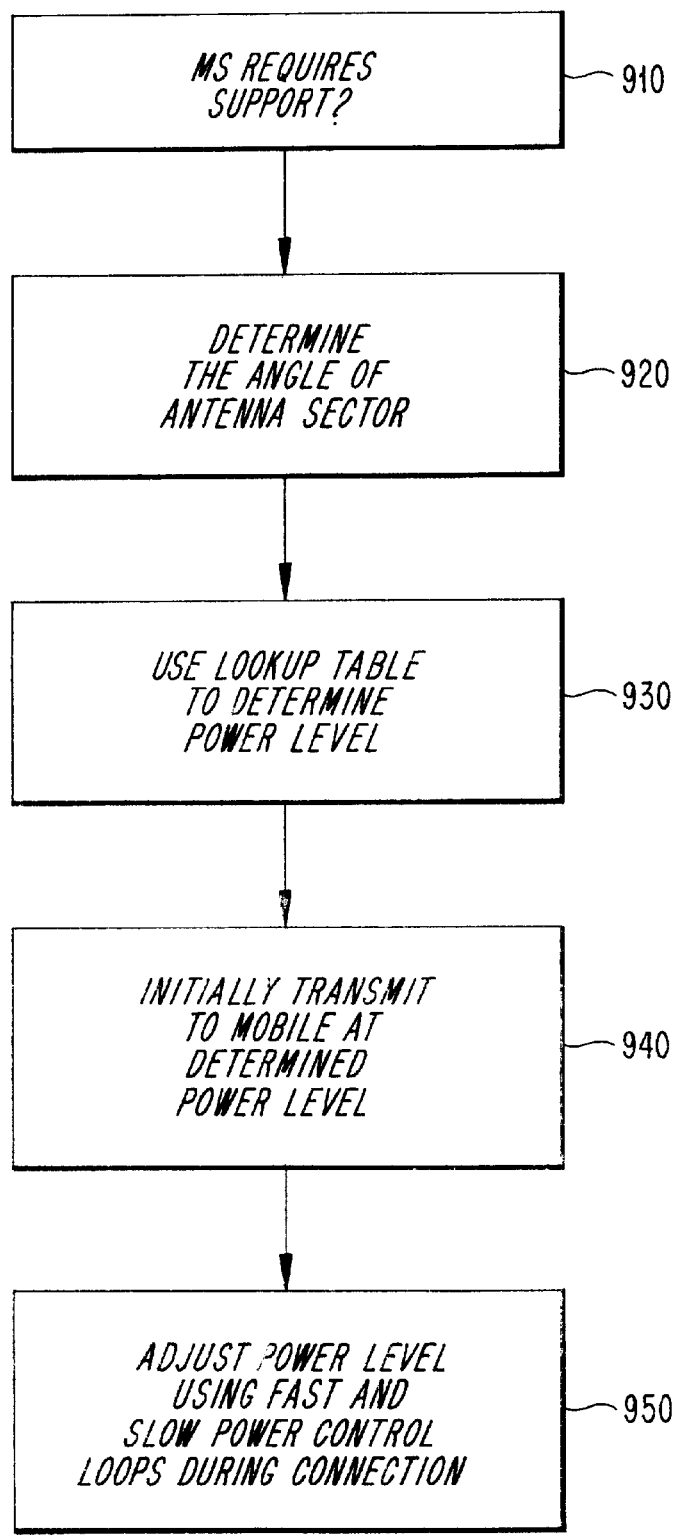

TAILORED POWER LEVELS AT HANDOFF AND CALL SETUP

This application claims priority under 35 U.S.C. § 119 to U.S. Provisional Patent Application No. 60/131,223 filed on Apr. 27, 1999, the entire content of which is hereby incorporated by reference. This application is related to co-pending U.S. patent application Ser. No. 60/131,239 "Tailored Coverage Area For Adaptive Antennas", the entire content of which is hereby expressly incorporated by reference.

BACKGROUND

The present invention relates to the use of power control techniques in cellular radio telephone communication systems, and more particularly, to methods and systems related to power control for base stations.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

FIG. 1 illustrates an example of a conventional cellular radio communication system 100. The radio communication system 100 includes a plurality of radio base stations 170a–n connected to a plurality of corresponding antennas 130a–n. The radio base stations 170a–n in conjunction with the antennas 130a–n communicate with a plurality of mobile stations (e.g. stations 120a, 120b and 120m) within a plurality of cells 110a–n. Communication from a base station to a mobile station is referred to as the downlink, whereas communication from a mobile station to the base station is referred to as the uplink.

The base stations are connected to a mobile switching center (MSC) 150. Among other tasks, the MSC coordinates the activities of the base stations, such as during the handoff of a mobile station from one cell to another. The MSC, in turn, can be connected to a public switched telephone network 160, which services various communication devices 180a, 180b and 180c.

Power control techniques have been implemented in radiocommunication systems to ensure reliable reception of a signal at each mobile station, i.e., to provide a signal to interference ratio (SIR) above a prescribed threshold for each mobile station. To improve the reception of a mobile station whose SIR drops below this threshold, the energy of the signal may be increased to appropriate levels. However, increasing the energy associated with one mobile station increases the interference associated with other nearby mobile stations which may be located in the same cell or in nearby cells. As such, the radio communication system must strike a balance between the requirements of all mobile stations, located in the same cell and in nearby cells, sharing the same common channel and adjacent channels. A steady state condition is reached when the SIR requirements for all mobile stations within a given radio communication system are satisfied. Generally speaking, the balanced steady state condition may be achieved by using power levels which are neither too high nor too low. Transmitting messages at unnecessarily high power levels increases interference experienced at each mobile receiver, and limits the number of signals which may be successfully communicated on the common channel and on adjacent channels (e.g. reduces system capacity).

This technique for controlling transmit power in radio-communication systems is commonly referred to as a fast power control loop. The initial SIR target is established based upon a desired quality of service (QoS) for a particular connection or service type. For non-orthogonal channels, the actual SIR values experienced by a particular mobile station or base station can be expressed as:

$$SIR = \frac{\text{Mean power of received signal}}{\text{Sum of the mean powers of all interfering signals}} \quad (1)$$

The SIR is measured by the receiving party and is used for determining which power control command is sent to the transmitting party.

A slow power control loop can then be used to adjust the SIR target value on an ongoing basis. For example, the mobile station can measure the quality of the signals received from the base station using, for example, known bit error rate (BER) or frame error rate (FER) techniques. Based upon the received signal quality, which may fluctuate during the course of a connection between the base station and a mobile station, the slow power control loop can adjust the SIR target that the fast power control loop uses to adjust the base station's transmitted power. Similar techniques can be used to control uplink transmit power.

FIG. 2 illustrates the physical relationship between the base stations of two cells A and B and their relative transmit power levels. In a conventional wireless communication system, base station 210A transmits signals to mobile stations which are located within cell A, as defined by the cell border 250. The cell border 250 can be a point where the strength of the signals transmitted at full power from base station 210A equals the strength of the signals transmitted at full power from base station 210B.

When a mobile station which is currently communicating with base station 210A moves over the cell border 250 into cell B, the mobile station will continue to communicate with base station 210A until the mobile station crosses hysteresis boundary 220B. The area in cell B from cell border 250 to hysteresis boundary 220B is known in the art as the hysteresis zone. The hysteresis zone is used by the wireless communication system to avoid a "ping-pong" handoff effect, i.e., a mobile station which continuously hands-off based solely upon which base station is providing a greater signal strength at a particular instant of time. Accordingly, the mobile station will continue to communicate with base station 210A until there is a more significant change in the relative strength of the signals transmitted from base stations 210A and 210B. Typically the hysteresis zone is set such that there is approximately a 3–5 dB difference in the signal strengths transmitted from base station 210A and base station 210B. Although FIG. 2 illustrates the hysteresis zone as a uniform area surrounding the cell border 250, one skilled in the art will recognize that hysteresis is typically implemented in wireless communication systems by adding a predetermined signal strength value to the signal strength of the current connection. Hence, the actual area of the hysteresis zone will depend upon signal propagation conditions.

Now that the concept of hysteresis has been explained, a brief overview of a conventional handoff from base station 210A to base station 210B is presented below. When a mobile station in communication with base station 210A is moving towards base station 210B, the mobile station maintains communication with base station 210A until the mobile station crosses over the end of the hysteresis zone at hysteresis boundary 220B. When the mobile station crosses hysteresis boundary 220B, the mobile station is handed off to base station 210B. In typical wireless communication systems, since the base station does not know how far the mobile station is from the base station, the new base station begins transmitting signals to the mobile station at full power. For example, when a mobile station is handed off from base station 210A to base station 210B, base station 210B begins transmitting signals to the mobile station at full power such that the signals transmitted from base station 210B provide an acceptable quality signal out to the end of the hysteresis zone at hysteresis boundary 220A. However, as described above, mobile stations are typically located inside the hysteresis zone at handoff, not at the far boundary of the hysteresis zone. Accordingly, transmitting signals to a mobile station which has just undergone handoff at full power unnecessarily increases the interference in cell A and other nearby cells (not shown).

A second situation where a base station unnecessarily transmits to a mobile station at full power is during call set-up. Call set-up occurs when a mobile station either receives an incoming call or places an outgoing call. Since, in these situations, a mobile station can be located anywhere in the cell, the base station initially transmits signals to the mobile station at full power to increase the likelihood that the call set-up with the mobile station is successful.

FIG. 3 illustrates a cell 350 containing a base station 310 and a mobile station 390. When mobile station 390 initiates a call, the base station 310 initially begins transmitting to mobile station 390 at full power. The base station transmits at full power to ensure an acceptable signal quality in the region between the cell border 350 and the edge of the hysteresis zone 320. By transmitting at full power, signals from base station 310 actually propagate beyond the hysteresis boundary 320 to, for example, boundary 330. Boundary 330 is exemplary and merely illustrates where the signal power from base station 310 falls below the noise floor. One skilled in the art will recognize that the signals from base station 310 will in practice propagate infinitely. However, as described above, transmitting at full power generally increases interference without providing a substantial increase in the success of the call set-up between the base station and mobile station.

Accordingly, it would be desirable to provide a radiocommunication system in which base station power levels are minimized at call set-up and handoff to reduce system interference and to increase capacity. It would also be desirable to provide a radiocommunication system where system interference is reduced without increasing the amount of system resources used in the reduction of system interference.

SUMMARY

These and other problems, drawbacks and limitations of conventional techniques are overcome according to the present invention, wherein less than full power can be used to transmit signals by base stations at call set-up and/or handoff. According to a first exemplary embodiment, the initial, individual transceiver power output for signals to be transmitted to a mobile station being handed off to that base station can be set to, for example, 2–5 dB less than the base station's full transmit power, wherein the reduction in transmit power is a function of the depth of the hysteresis zone associated with both the cell handing off the call and the cell receiving the handoff. Further, the specific power reduction relative to full transmit power can be a fixed number within the aforementioned 2–5 dB exemplary range or may be variable (and outside of this range) based on factors such as a mobile station's environment, system loading, quality reports from the mobile station. Moreover, in sectorized cells which have different size hysteresis zones for each sector, the reduction in power level will vary depending upon which sector the mobile station is located.

According to another exemplary embodiment of the present invention, the initial base station transceiver output power at call set-up may be reduced to less than the base station's full output power. The specific power reduction relative to the full transmit power could be a function of a value associated with the hysteresis zone in the particular cell where the call is being set-up. In addition, the specific power reduction relative to the full transmit power can be a fixed number within a 2–5 dB exemplary range or may be variable (and outside of this range) based on factors such as a mobile station's environment, system loading and quality reports from the mobile station.

An object of the present invention is to provide a method and apparatus for reducing interference in a power controlled, radiocommunication system.

Another object of the present invention is to provide a method and apparatus for reducing the amount of power transmitted from a base station to a mobile station at call set-up and/or call handoff.

Yet another object of the present invention is to reduce the amount of power transmitted from a base station to a mobile station at call set-up and/or call handoff without increasing the amount of system resources required for the reduction in power.

A further object of the present invention is to provide techniques for lowering the requirements for power matching between base stations, since the full power levels won't be used during the initiation of at least most handoffs or call set-ups.

The above, and other objects of the present invention are achieved according to exemplary embodiments of the present invention by a method for initiating communication between a base station and a mobile station in a radio communication system. A base station is notified whether a mobile station requires support. The base station then determines whether the mobile station requires support for a call handoff or for a call set-up. A reduced initial power level is determined for transmission from the base station to the mobile station, where the value of the reduced power level is a function of whether the mobile station requires support for a call handoff or for a call set-up. The base station then transmits to the mobile station at the reduced power level. Since the reduced power levels do not require measurements to be made by the base station and/or the mobile station the amount of system resources used is not increased by the inventive system.

BRIEF DESCRIPTION OF THE DRAWINGS

The foregoing objects, features and advantages of the present invention, as well as other features, will be more readily understood upon reading the following detailed description in conjunction with the drawings in which:

FIG. 9 illustrates a method for reducing the full power for a base station using a sectorized antenna according to an exemplary embodiment of the present invention.

DETAILED DESCRIPTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile stations is performed over a number of time slots. However, those skilled in the art will appreciate that the concepts disclosed herein find use in other protocols, including, but not limited to, frequency division multiple access (FDMA), code division multiple access (CDMA), or some hybrid of any of the above protocols. Likewise, some of the exemplary embodiments provide illustrative examples relating to the global system for mobile communication (GSM) system, however, the techniques described herein are equally applicable to radio base stations in any system.

Figure 1:
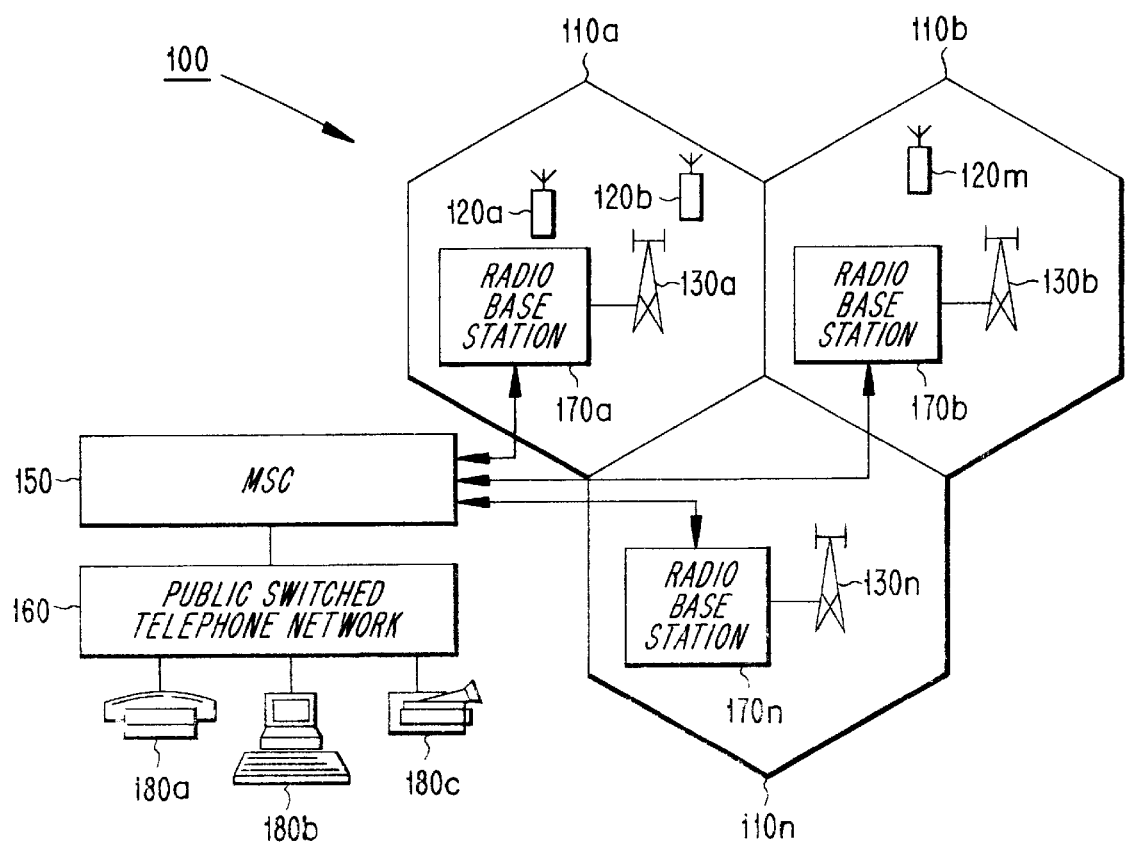
FIG. 1 illustrates a conventional radio communication system including plural base stations and a mobile switching center.
Figure 2:
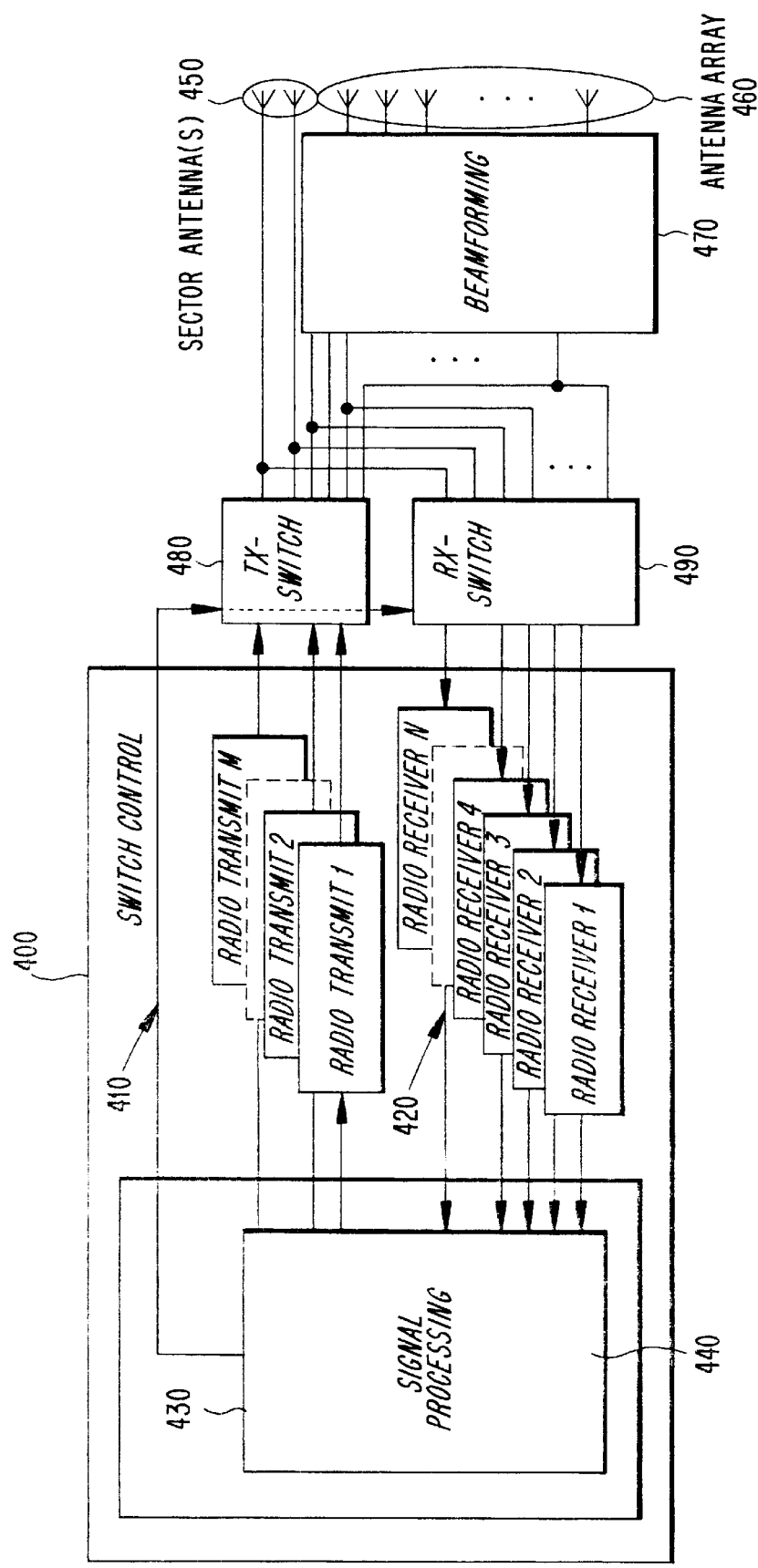
FIG. 2 illustrates conventional signal propagation by base stations at the initiation of a call handoff.
Figure 3:
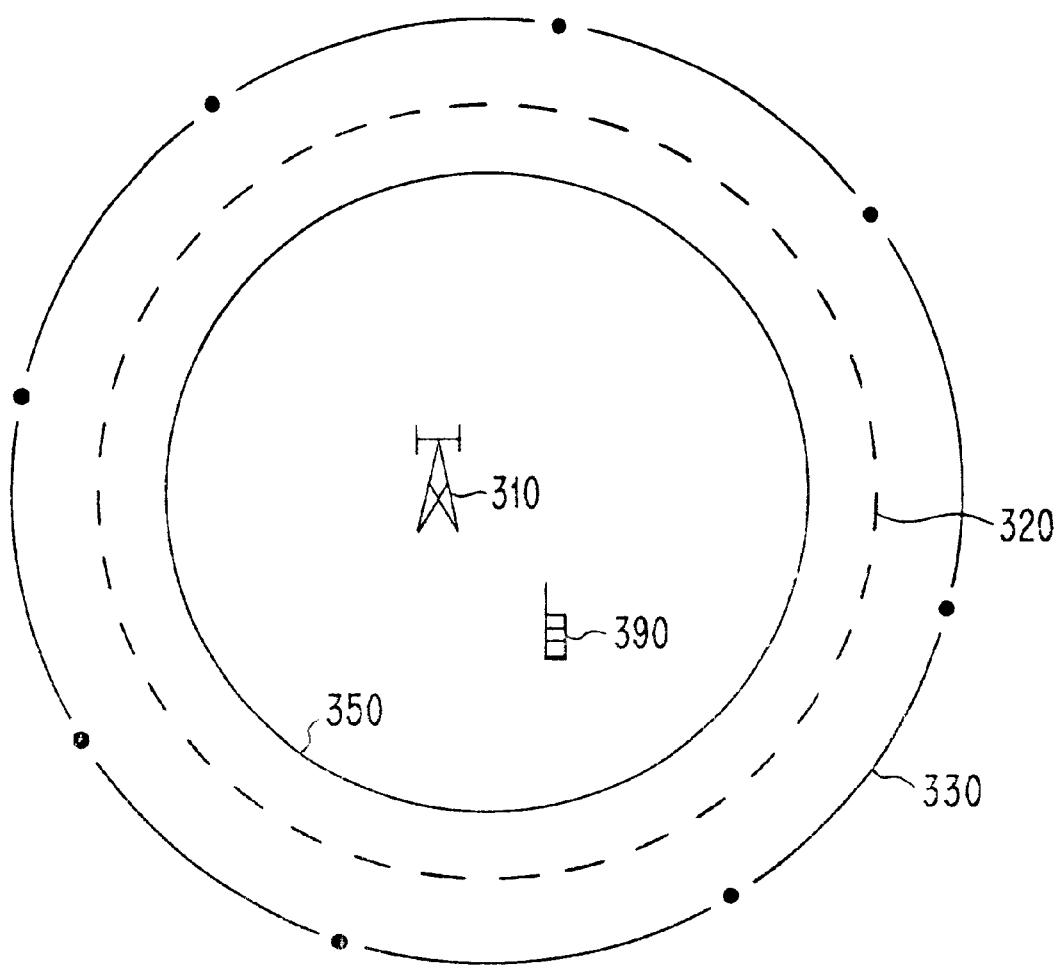
FIG. 3 illustrates conventional signal propagation by a base station at the initiation of a call set-up.
Figure 4:
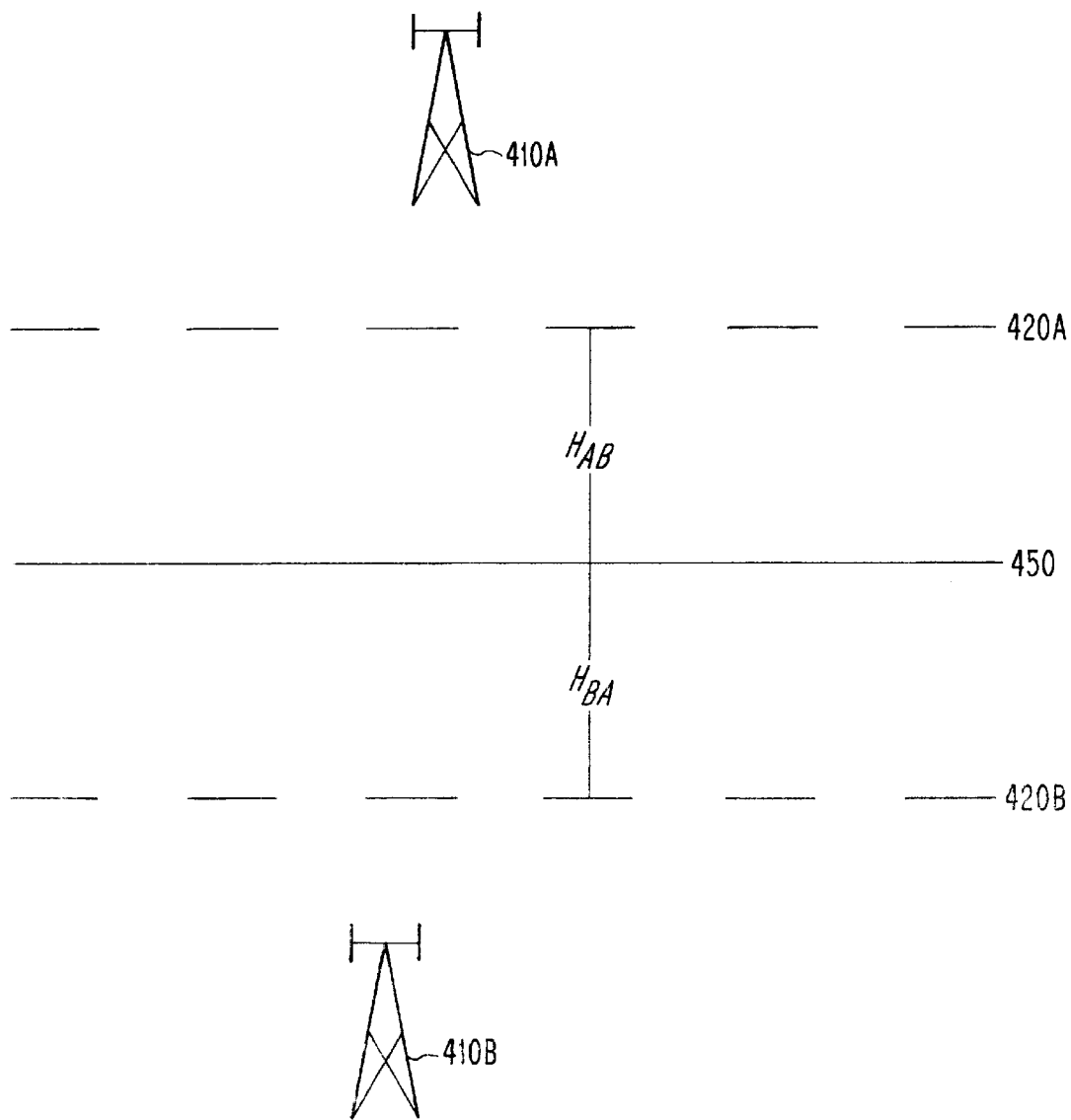
FIG. 4 illustrates signal propagation by base stations at the initiation of a handoff according to an exemplary embodiment of the present invention.

FIG. 4 illustrates signal propagation by two base stations in a wireless communication system according to an exemplary embodiment of the present invention. As stated above, conventional base stations such as base station 410B initially transmit at full power when a mobile station is handed off from base station 410A. The full power level is set such that an acceptable quality signal is received by a mobile station even if the mobile station is located at hysteresis boundary 420A, i.e., the opposite edge of the hysteresis zone. However, since base station 410A is responsible for communicating with the mobile station until the mobile station reaches the end of the hysteresis zone $H_{BA}$, illustrated by hysteresis boundary 420B, the maximum distance that base station 410B has to initially transmit is the distance between the base station and the hysteresis boundary 420B. Accordingly, in the exemplary embodiment illustrated in FIG. 4, when a mobile station is handed off from base station 410A to base station 410B, base station 410B initially transmits at a reduced power level which provides a mobile station an acceptable quality signal at hysteresis boundary 420B. Equation (2) below illustrates the relationship of new initial reduced power level ReducedPower$_{new}$ and the conventional full power level FullPower$_{conventional}$:

$$ReducedPower_{new} = FullPower_{conventional} - \left[\frac{H_{BA}}{C_1} + \frac{H_{AB}}{C_2}\right] \quad (2)$$

where $H_{AB}$ is the difference in power level between the hysteresis boundary 420A and cell border 450, while $H_{BA}$ is the difference in power level between hysteresis boundary 420B and cell border 450. $C_1$ and $C_2$ are factors which are set to ensure that the mobile station has a better quality connection after the handoff, and should be set so as to avoid the above-mentioned "ping-pong" effect. Accordingly, although the equation above reduces the amount of transmit power at handoff, at least a portion of the hysteresis zone, as represented by $C_1$ and $C_2$ in equation 2, should be maintained to avoid the "ping-pong" effect. Thus, the initial transmit power level in accordance with the present invention is less than full power.

Figure 5:
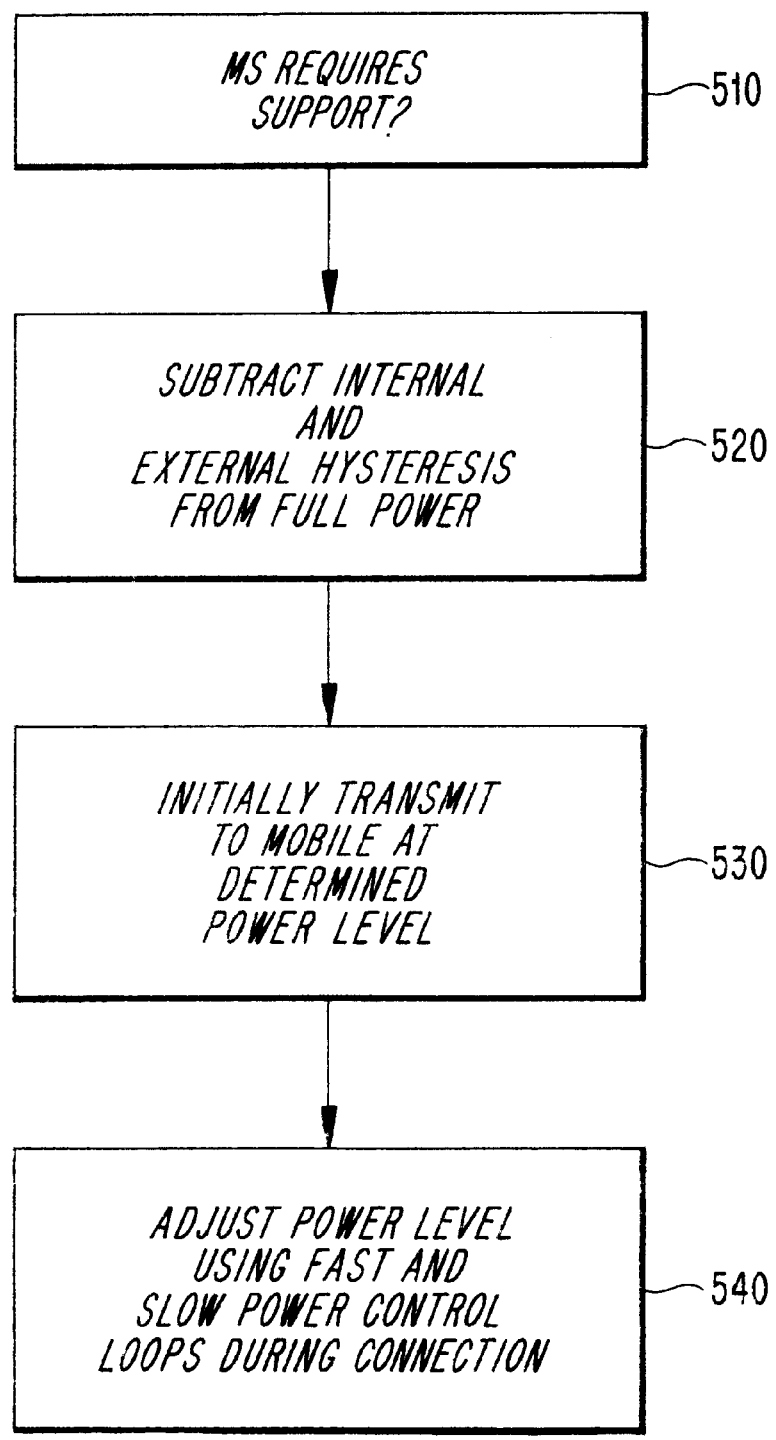
FIG. 5 illustrates a method for reducing the full power at call handoff according to an exemplary embodiment of the present invention.

FIG. 5 illustrates a method for reducing the initial transmit power at call handoff. In step 510, the base station determines whether a mobile station requires support for a call handoff. This determination can be performed according to conventional methods for performing call handoff. If a base station determines that a mobile station requires support, the base station will subtract a value associated with the drop-off for the internal and external hysteresis zones from the full power, in accordance with step 520. In step 530, the base station transmits to the mobile station at the power level determined in step 520. Then, in accordance with step 540, the power level at which the base station continues to transmit is adjusted using the fast and slow power control loops.

In accordance with a second exemplary embodiment of the present invention, full power is reduced at the initiation of call set-up. As described above, base station 610 would typically transmit at full power at the initiation of a call set-up with a mobile station. This full power would typically propagate beyond the hysteresis boundary 620 to, for example, boundary 630. However, under ordinary circumstances, a mobile station which is located in cell A or cell B, will perform a call set-up with a base station in cell A or cell B, respectively, and not with base station 610.

According to the present invention, base station 610, at call set-up transmits signals to a mobile station at a reduced power level which provides an acceptable signal up to the cell boundary 650 without causing a substantial increase in the amount of interference to surrounding cells, e.g., cells A and B. This maximum power level can be achieved by decreasing the full power level conventionally transmitted from base station 610 by a value associated with the power level drop off of the hysteresis zone as illustrated by equation (3) below, where ReducedPower$_{new}$ represents the new maximum power level, FullPower$_{conventional}$ is the power level that the base station would typical use to transmit at the initiation of a call set-up and hysteresis is a value associated with the power drop-off due to the hysteresis zone.

$$ReducedPower_{new} = FullPower_{conventional} - \frac{hysteresis}{C_1} \quad (3)$$

One will notice that unlike the handoff scenario, the call set-up scenario reduces the initial power transmission by a single hysteresis value because the mobile station may be located anywhere within the cell up to cell border 650 including within the hysteresis zone (not shown) inside of cell border 650. As discussed above, if a call set-up is required for a mobile station located in hysteresis zone between cell border 650 and hysteresis boundary 620, the call set-up for the mobile station will typically be handled by the base station corresponding to the cell which the mobile station is located in. Further, $C_1$ should be set to avoid the "ping-pong" effect where the mobile station is repeatedly handed off between two cells. Accordingly, although the inventive power reduction scheme reduces the initial transmit power from a base station at call setup, at least a portion of the hysteresis zone must be maintained to avoid the "ping-pong" effect.

Equation 3 above assumes that all of the surrounding cells have the same hysteresis value. However, equation 4 below can be used if there are different hysteresis values for surrounding cells:

$$ReducedPower_{new} = FullPower_{conventional} - \frac{\min(H_{AB}, H_{AC}, \cdots, H_{AX})}{D} \quad (4)$$

where $H_{AB}$ is the hysteresis zone between cell A, the cell which is performing the call set-up, and surrounding cell B; $H_{AC}$ is the hysteresis zone between cell A and surrounding cell C; and $H_{AX}$ is the hysteresis zone between cell A and surrounding cell X. The factor D is used to ensure that at least a part of the hysteresis zone is maintained so as to avoid the "ping-pong" effect. Accordingly, equation 4 above reduces the initial call set-up full power by the minimum hysteresis zone of all of the surrounding cells.

Figure 6:
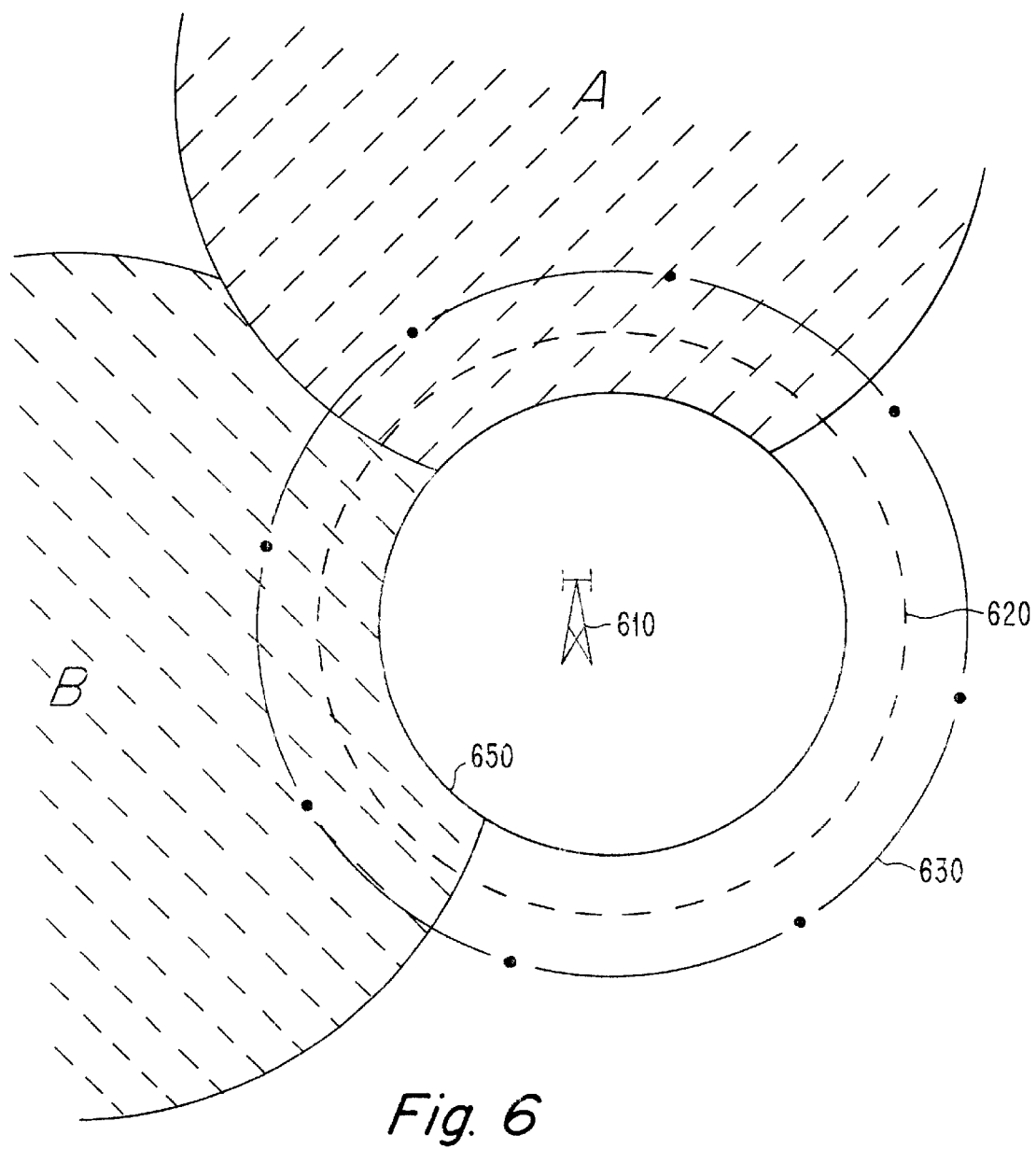
FIG. 6 illustrates signal propagation by a base station at the initiation of a call set-up according to an exemplary embodiment of the present invention.
Figure 7:
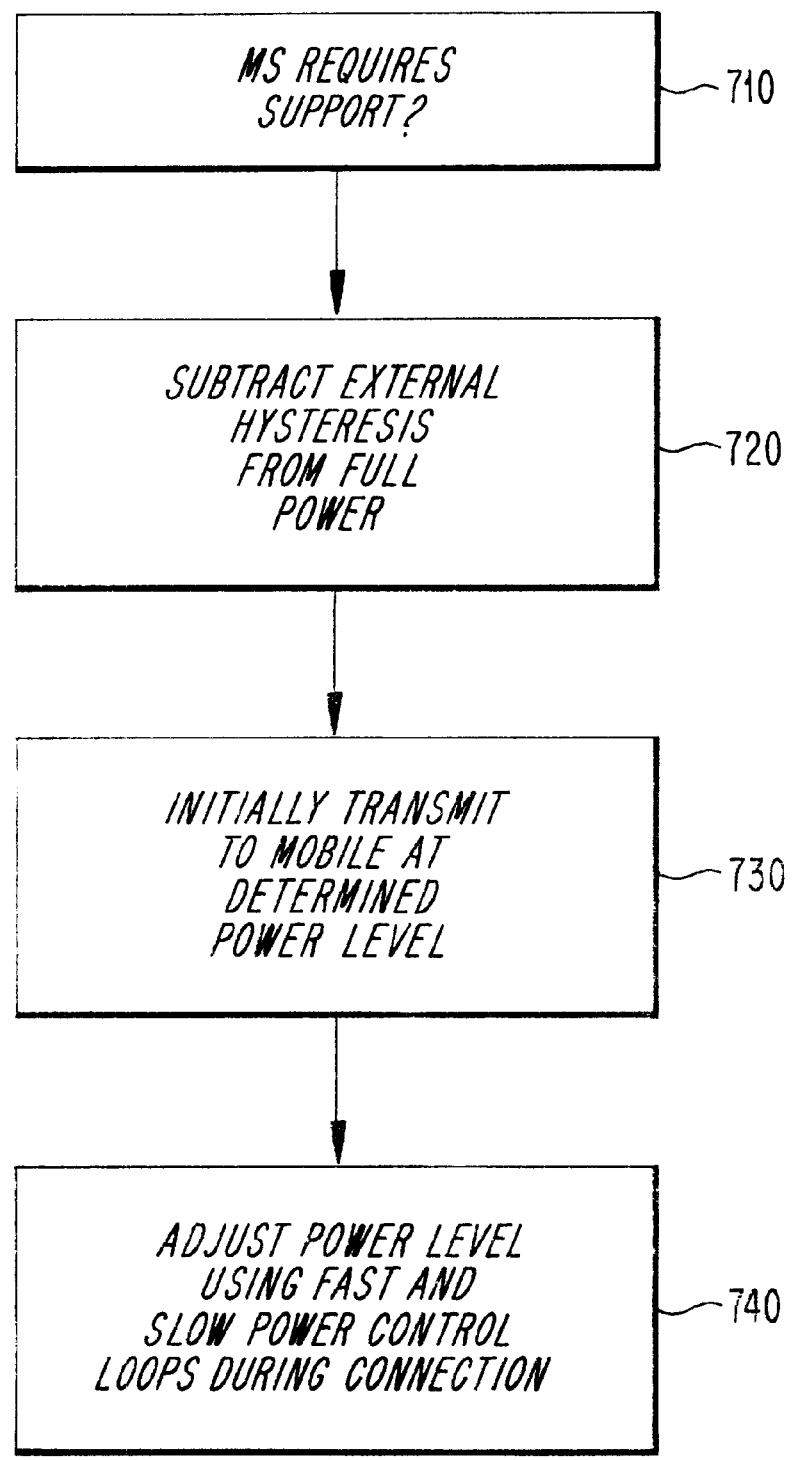
FIG. 7 illustrates a method for reducing the full power at call set-up according to an exemplary embodiment of the present invention.

FIG. 7 illustrates an exemplary method for reducing the initial base station transmit power at call set-up in accordance with the present invention. In step 710 it is determined whether a mobile station requires support for a call set-up. If a mobile station requires support for a call set-up then a value associated with the power drop-off due to the external hysteresis zone, i.e., the zone between cell boundary 650 and hysteresis boundary 620 in FIG. 6, is subtracted from full power in accordance with step 720. Once the reduced power level has been determined the base station transmits to the mobile station at the power level determined in step 720, in accordance with step 730. Then in accordance with step 740, the power level at which the base station continues to transmit is adjusted using the fast and slow power control loops.

Figure 8:
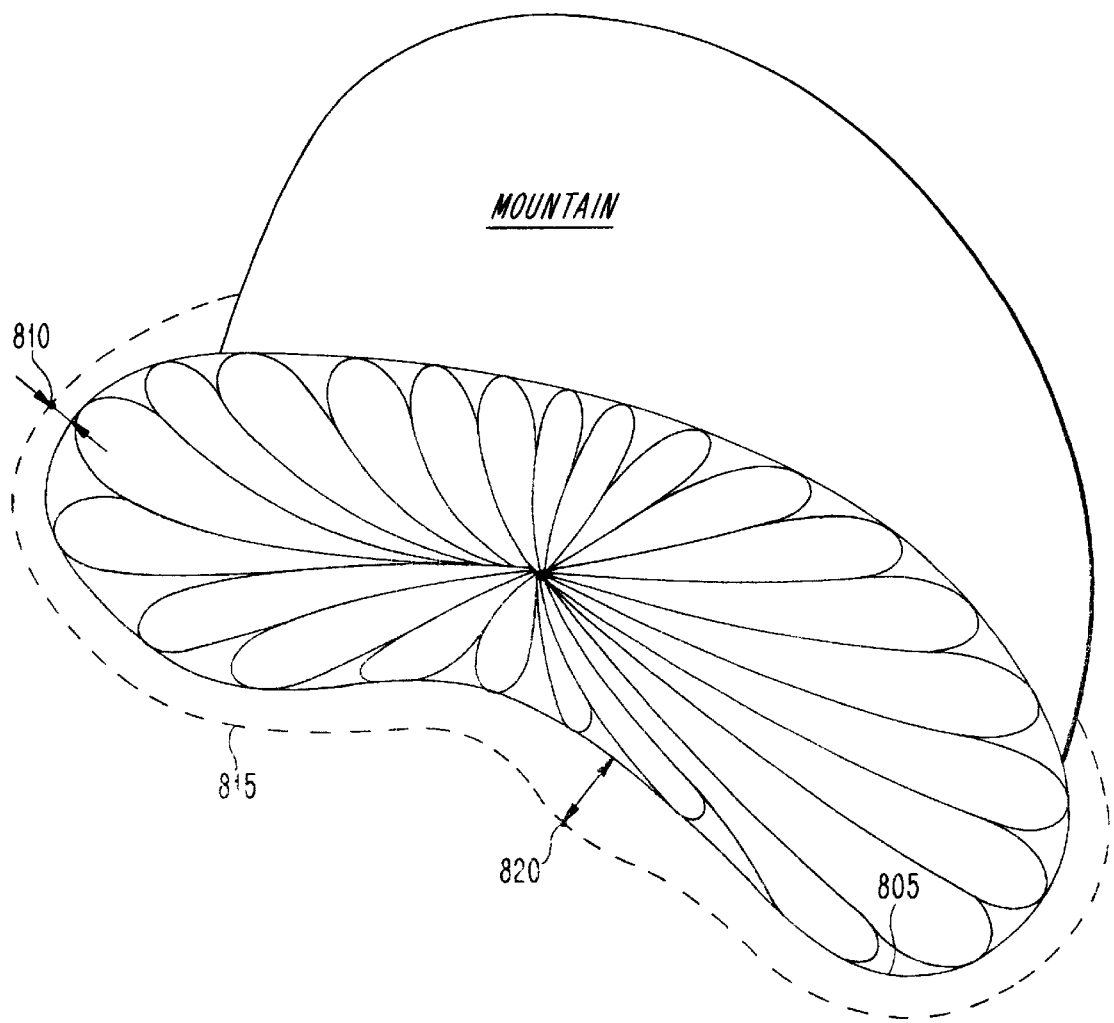
FIG. 8 illustrates signal propagation by a base station using an adaptive antenna according to an exemplary embodiment of the present invention.

FIG. 8 illustrates a cell where the base station uses an adaptive antenna. As illustrated in FIG. 8, the area of the hysteresis zone may be different for different sectors of the antenna. For instance, at point 810 the hysteresis zone may have a 5 dB drop-off from the edge of cell 805 to the hysteresis boundary 815, while at point 820 there may be a 7 dB drop-off from the cell border 805 to the hysteresis boundary at point 820. To account for the varying size of the hysteresis zone a lookup table containing entries for angles which correspond to a particular antenna sector and corresponding entries which identify the amount of hysteresis which is present in the particular sector. Further, the lookup table could contain the conventional maximum power level which a base station would typically transmit to a mobile station at the initiation of the handoff. For more information about look-up tables and sectorized cells, the interested reader should refer to co-pending U.S. patent application Ser. No. 60/131,239 "Tailored Coverage Area For Adaptive Antennas" the entire content of which is hereby expressly incorporated by reference.

FIG. 9 illustrates an exemplary method for controlling the power of a base station according to the present invention. In step 910 the base station determines whether a mobile station requires support, e.g., for call set-up or call handoff. If a mobile station requires support, then the base station determines the angle of the antenna sector associated with the mobile station, in accordance with step 920. Based on the type of support determined in step 910 and the angle determined in step 920, the base station uses a lookup table to determine the appropriate reduced power level, in accordance with step 930. Alternatively, one skilled in the art will recognize that the lookup table could contain a value corresponding to a reduction from full power and then the base station could reduce the full power by this value. The base station then initially transmits to the mobile station at the reduced power level, in accordance with step 940. The power level continues to be adjusted using the fast and slow power control loops in accordance with step 950.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. In a radio communication system, a method for initiating communication between a base station and a mobile station, comprising the steps of:

notifying a base station whether a mobile station requires support;

determining, by the base station, whether the mobile station requires support for a call handoff or for a call set-up;

determining a reduced initial power level for transmission from the base station to the mobile station, wherein the value of the reduced power level is a function of whether the mobile station requires support for a call handoff or for a call set-up, the reduced initial power level being a difference between a full power level of the base station and a sum of a handoff hysteresis zone value for a cell in which the base station is located and a handoff hysteresis zone value for a cell which is supporting the mobile station prior to the call handoff; and transmitting from the base station to the mobile station at the reduced power level.

2. The method of claim 1, wherein the handoff hysteresis zone value for the cell in which the base station is located is reduced by a factor, wherein the factor ensures at least a portion of a hysteresis zone associated with the cell in which the base station is located is maintained.

3. The method of claim 2, wherein the handoff hysteresis zone value for the cell which is supporting the mobile station prior to the call handoff is reduced by a factor, wherein the factor ensures at least a portion of a hysteresis zone associated with the cell which is supporting the mobile station prior to the call handoff is maintained.

4. The method of claim 1, wherein if the mobile station requires support for a call set-up, the reduced initial power level is a difference between a full power level of the base station and a hysteresis zone value for a cell in which the base station is located.

5. The method of claim 4, wherein the hysteresis zone value is reduced by a factor, wherein the factor ensures at least a portion of the cell's hysteresis zone is maintained.

6. The method of claim 1, wherein if the mobile station requires support for a call set-up, the reduced initial power level is a difference between a full power level of the base station and a minimum of hysteresis zone values for all cells which border the cell in which the base station is located.

7. The method of claim 1, wherein the reduced initial power level is also a function of an angle of an antenna sector, which will support the mobile station.

8. The method of claim 1, wherein after initiation of the support between the base station and the mobile station, the transmission power level from the base station to the mobile station is determined using a fast power control loop and a slow power control loop.

9. In a radio communication system, a base station comprising:
- means for receiving a notification from a mobile station which requires support;
- means for determining a reduced initial power level for transmission from the base station to the mobile station, the value of the reduced power level is a function of a type of support required by the mobile station, wherein the reduced initial power level is a difference between a full power level of the base station and a sum of a handoff hysteresis zone value for a cell in which the base station is located and a handoff hysteresis zone value for a cell which is supporting the mobile station prior to the call handoff; and
- means for transmitting from the base station to the mobile station at the reduced power level.

10. The base station of claim 9, wherein the handoff hysteresis zone value for the cell in which the base station is located is reduced by a factor, wherein the factor ensures at least a portion of a hysteresis zone associated with the cell in which the base station is located is maintained.

11. The base station of claim 9, wherein the handoff hysteresis zone value for the cell which is supporting the mobile station prior to the call handoff is reduced by a factor, wherein the factor ensures at least a portion of a hysteresis zone which is associated with the cell which is supporting the mobile station prior to the call handoff is maintained.

12. The base station of claim 9, wherein if the mobile station requires support for a call set-up, the reduced initial power level is a difference between a full power level of the base station and a hysteresis zone value for a cell in which the base station is located.

13. The base station of claim 12, wherein the hysteresis zone value is reduced by a factor, wherein the factor ensures at least a portion of the cell's hysteresis zone is maintained.

14. The base station of claim 9, wherein if the mobile station requires support for a call set-up, the reduced initial power level is a difference between a full power level of the base station and a minimum of hysteresis zone values for all cells which border the cell in which the base station is located.

15. The base station of claim 9, wherein the reduced initial power level is also a function of an angle of an antenna sector which will support the mobile station.

16. The base station of claim 9, further comprising:
- means for, after initiation of the support between the base station and the mobile station, determining the transmission power level from the base station to the mobile station using a fast power control loop and a slow power control loop.

* * * * *